Dec. 13, 1932.  G. D. PARKER  1,890,586
MACHINE FOR MAKING CRATES
Filed Dec. 16, 1929  7 Sheets-Sheet 1

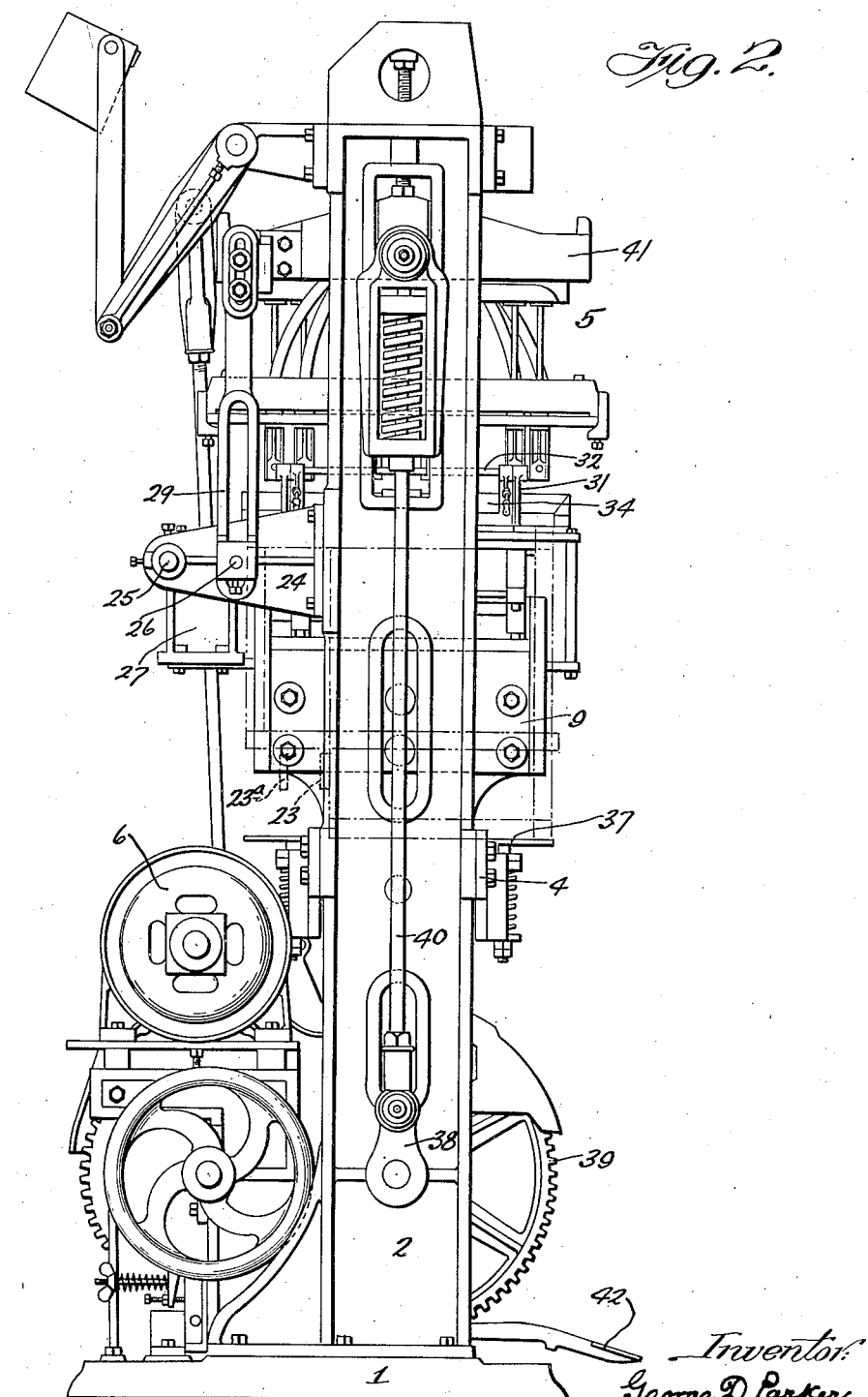

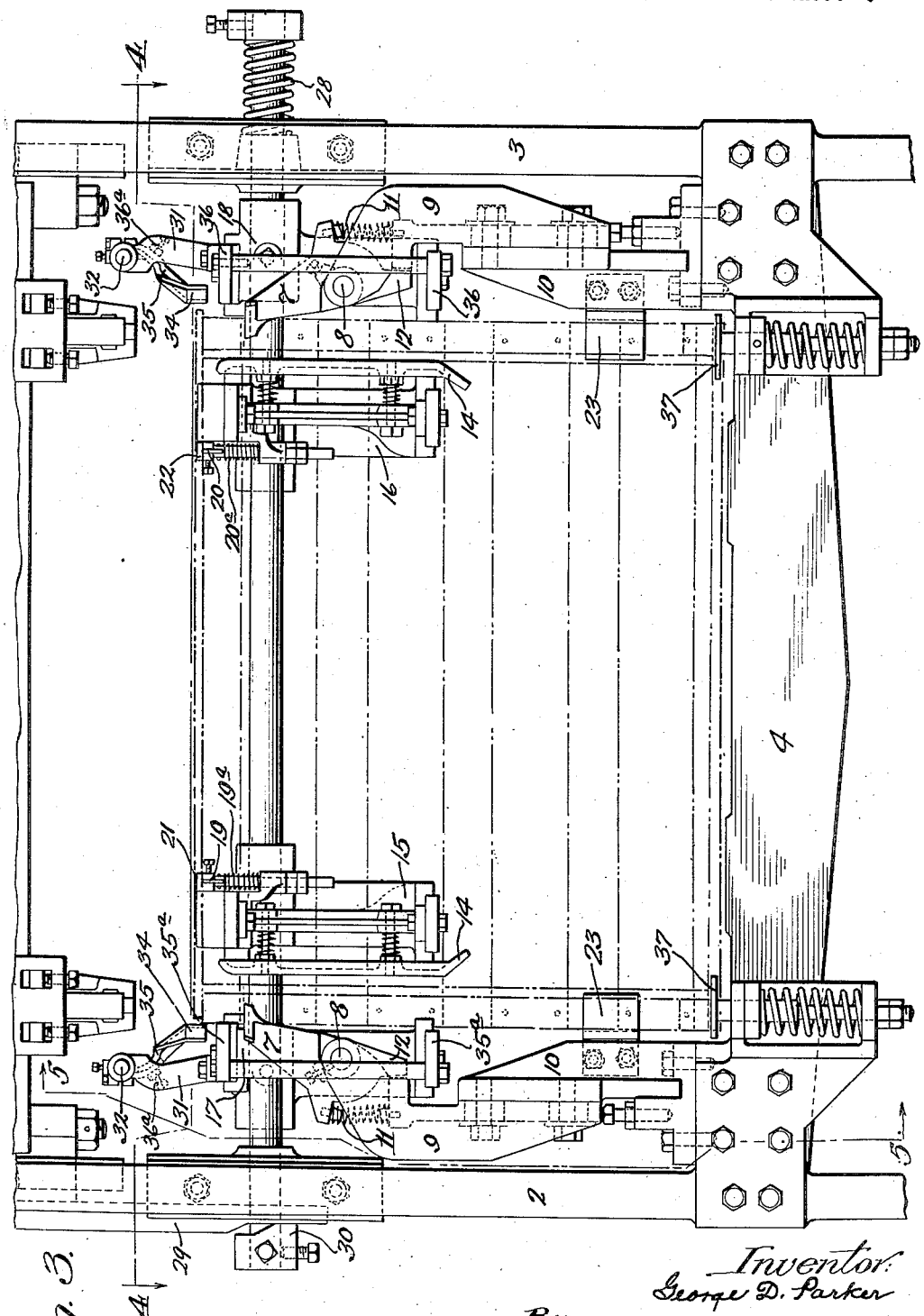

Dec. 13, 1932.  G. D. PARKER  1,890,586
MACHINE FOR MAKING CRATES
Filed Dec. 16, 1929   7 Sheets-Sheet 4
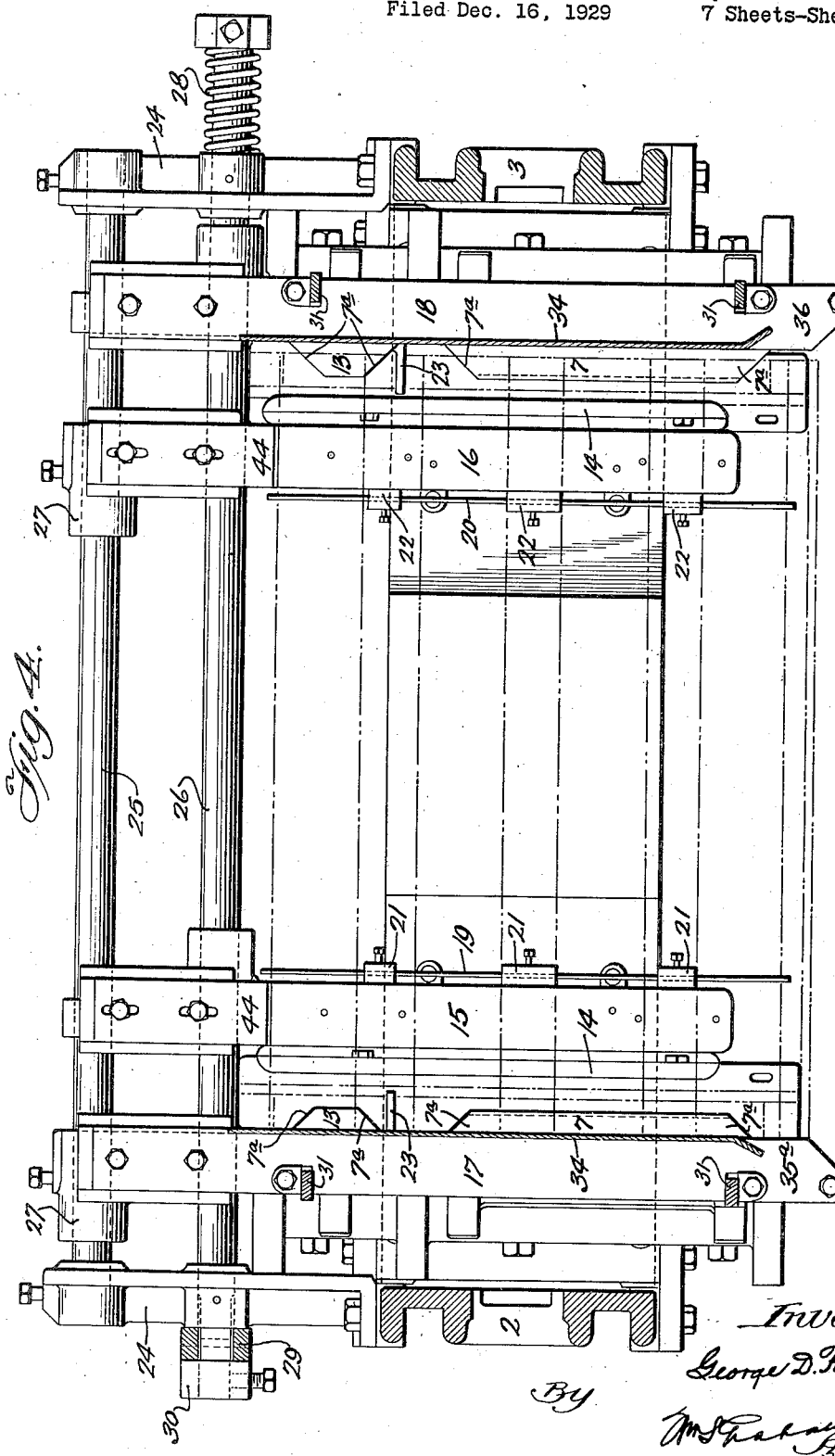

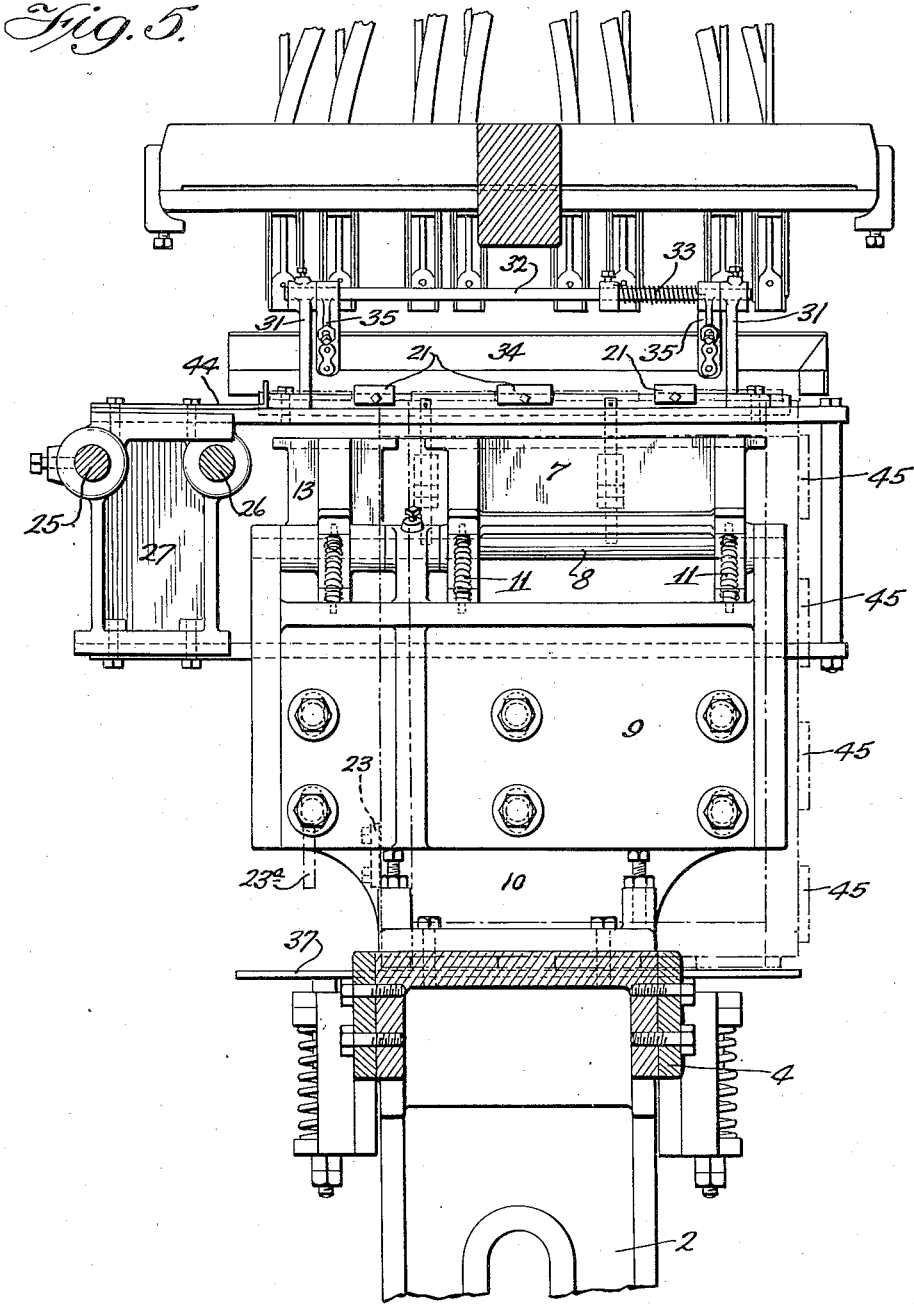

Dec. 13, 1932.　　　G. D. PARKER　　　1,890,586
MACHINE FOR MAKING CRATES
Filed Dec. 16, 1929　　7 Sheets-Sheet 6
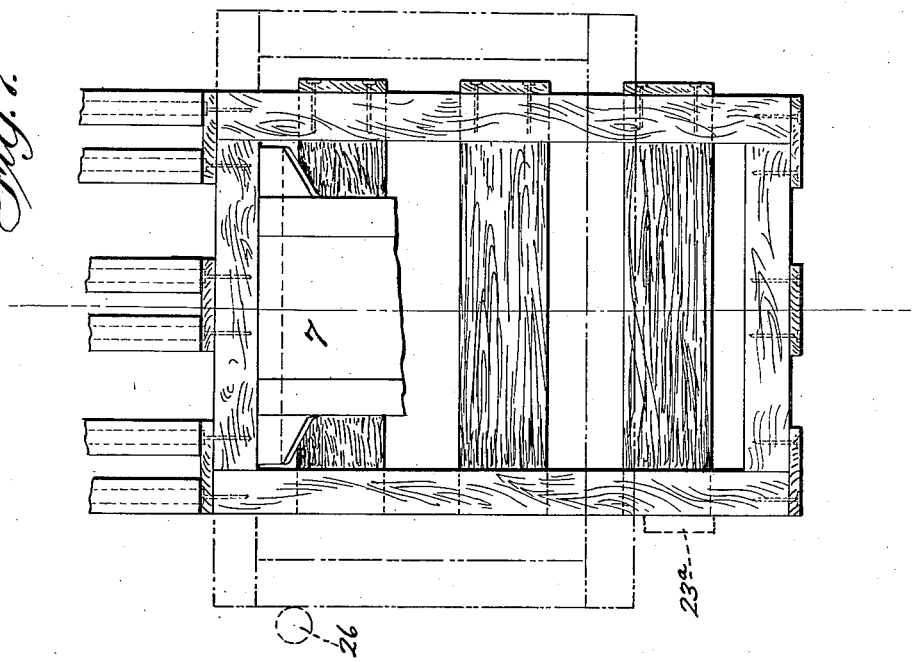
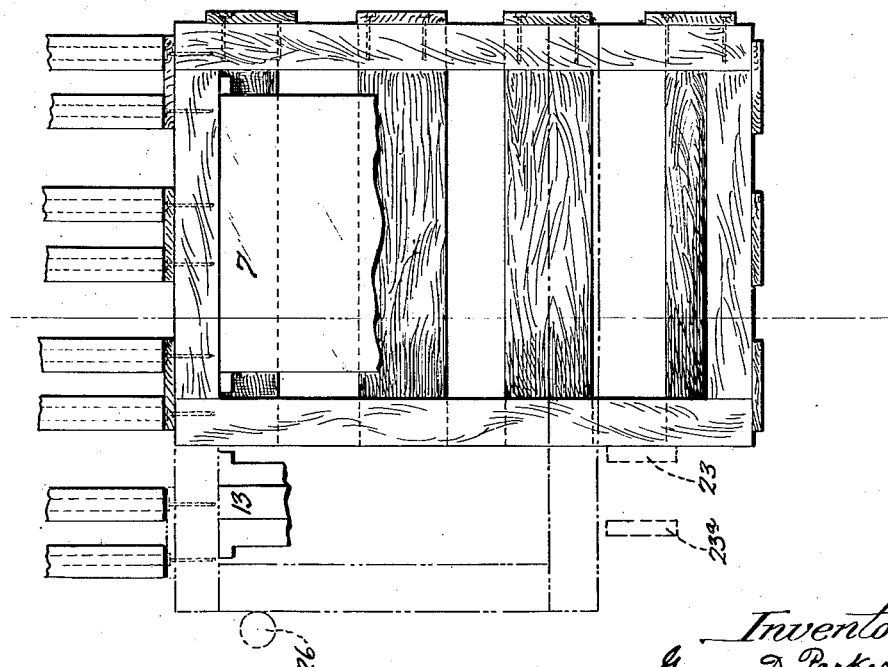
Inventor:
George D. Parker
By
M. Graham Atty.

Dec. 13, 1932.  G. D. PARKER  1,890,586
MACHINE FOR MAKING CRATES
Filed Dec. 16, 1929  7 Sheets-Sheet 7
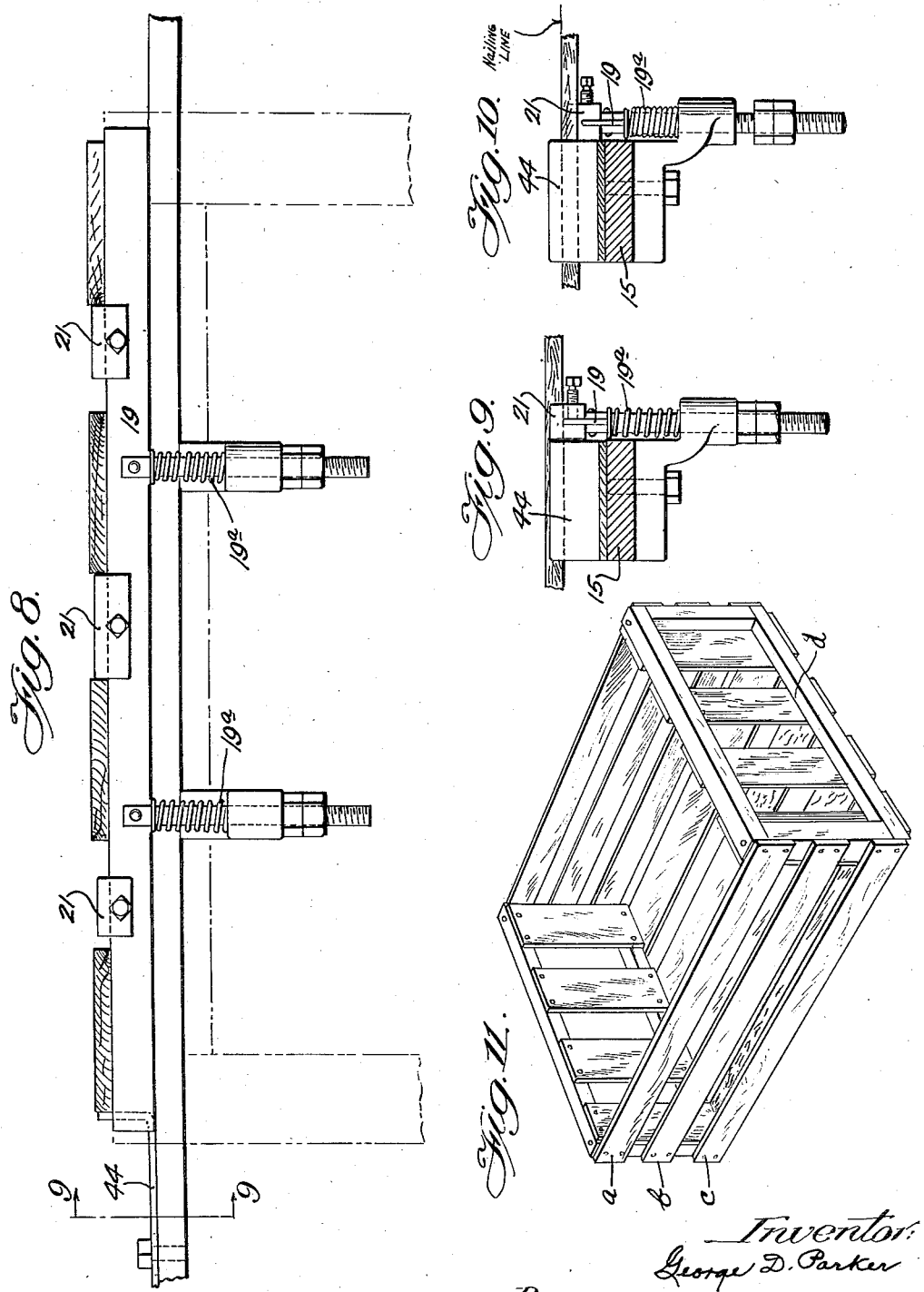

Patented Dec. 13, 1932

1,890,586

UNITED STATES PATENT OFFICE

GEORGE D. PARKER, OF RIVERSIDE, CALIFORNIA; CLARA B. PARKER, EXECUTRIX OF WILL OF SAID GEORGE D. PARKER, DECEASED

MACHINE FOR MAKING CRATES

Application filed December 16, 1929. Serial No. 414,357.

This invention relates to a machine for making crates and is particularly adapted to the making of crates and the like, such as are used for packing and shipping lettuce, and wherein the ends of the crates are made up of a frame with relatively thin slats nailed thereacross and these ends then placed in the machine by hand and side and bottom slats nailed thereto to form the crates. The end sections of the crates are not resistant enough to withstand the pressure of mechanically driving several nails at the same time which is necessary in machine nailing, therefore means had to be provided to support the end frames while the side and bottom slats were being nailed so that they would not collapse under the nailing pressure. For this reason, the making of lettuce crates has, heretofore, been a hand operation and therefore slow and expensive as compared to a machine operation.

In order to adapt a box nailing machine to the making of lettuce crates it was necessary to devise ways and means of supporting the end sections on rocking anvils that would contact with the top bar of the end frame directly under the nailing punches instead of supporting the end frames on the opposite frame edges as is always done in nailing up ordinary boxes. This required means for accurately positioning the end frames relative to each other and properly spaced apart to receive the side and bottom slats; means for easily and quickly placing and gauging the side and bottom slats to the positioned end frames and clamping the component parts to maintain their proper relative positions during the nailing operation. The height of the crate is less than the width so that the positioning of the component parts requires a shifting of the center of the crate relative to the machine when moving from the side nailing position to the bottom nailing position which condition is also provided for in the machine.

This invention is embodied in a box nailing machine of the usual type wherein the nails are automatically fed and delivered to the nailing chucks and punches; wherein the various operative elements comprising the whole machine are so timed and synchronized that the various operations occur in proper sequence but entirely controlled by the wishes of the operator, who in this instance manually places each of the component parts of a lettuce crate in proper relative positions against and in the control of special devices for holding and maintaining them during the several nailing operations necessary to complete the making of a crate, and wherein means are provided whereby the operator may defer the nailing operation until the several component parts are placed to his satisfaction after which he may release the mechanism when it will operate through one complete cycle and nail the positioned parts together and thus complete one step toward the making of the crate.

It is a principal object of the invention to provide a machine for automatically nailing together the parts of a lettuce crate. Further objects are to provide means in such a machine wherein the end frames are made before assembling and are positioned together with side and bottom slats in proper sequence to form a completed lettuce crate; to provide anvil supporting means for supporting the end frames of a crate in a manner to prevent collapse of the thin end slats during the driving of several nails at one time in securing the side or bottom slats thereto; to provide gauging means whereby the slats and end frames may be accurately and quickly placed without undue attention and skill from the operator; to provide manually manipulatable means whereby the operation of the nailing mechanism may be manually controlled and held from operation until the component parts of the crate are positioned to the satisfaction of the operator; to provide means for automatically segregating and delivering nails to the nailing mechanism and for controlling the release of said nails in the various nailing heads to suit the spacing of the slats and the number of slats being nailed at the same time; to provide a machine for nailing up crate parts wherein means are provided for gauging, positioning and maintaining these crate parts in proper relative relation during the several operations comprising the making of a crate which will give true and accurate spacing of the slats composing sides and bottom without the need of skilled labor; and to generally improve machines for making crates, boxes and the like.

With such objects in view as well as other advantages inherent in the invention, it is to be understood that the novel structural peculiarities; novel organization of elements and the separate and collective operations involved in carrying out the objects of the invention may be varied in their proportions, placements, general arrangement and operative relation within the scope of the claims hereto appended, without departing from the scope and nature of the invention.

In carrying out the objects of the invention in a concrete form or machine, other objects, advantages and improvements have been evolved than have been recited and in order to make the invention more clearly understood there are shown in the accompanying drawings means and mechanism embodying the preferred structural arrangement and the preferred disposition of the different parts and combinations, without limiting the claims to the details of construction shown, in which have been illustrated one way, only of embodying the creative part or concept of the invention in a concrete form or machine. The described devices are simply embodiments of the invention which other structures might also employ, and some of the parts and combinations of parts may be used without the others in different types of such machines without departure from the purview of my invention.

Reference to the accompanying drawings in connection with the description herein will give a much clearer and more comprehensive understanding of the arrangement and operation of a machine embodying my invention.

Figure 1 is a front elevation of an automatic nailing machine embodying my invention. This view very clearly shows the position and relation of the box end supporting anvils; the relation of the slat spacing mechanism thereto; the position of the nailing chucks and mechanism in their upper or inoperative positions; and below the anvil mechanism will be seen the power mechanism for operating the various devices.

Figure 2 is a side elevation of Fig. 1 and shows the several parts of the machine in the same relative positions.

Figure 3 is an enlarged front elevation of the central portion of Fig. 1 wherein is shown more clearly the same parts as in Fig. 1 but with more structural detail and in addition it shows box parts in their relative positions in dotted lines.

Figure 4 is a sectional plan taken on approximately the line 4—4 of Fig. 3, showing the various parts in the same relative positions with the crate parts dotted in position.

Figure 5 is a sectional elevation taken on approximately the line 5—5 of Fig. 3, and gives a very good side view of the supporting anvil on that side and the box parts again dotted in position.

Figure 6 is a diagrammatic view showing the position of a crate when nailing one of the set of side slats thereto comprising three spaced slats, and in dotted lines the position of the crate relative to the nailing mechanism when nailing four slats on the bottom.

Figure 7 is also a diagrammatic view showing the position of a crate while nailing three slats on the end and in dotted lines the position when nailing three slats on the bottom, in this case the crate is centrally placed for each nailing operation.

Figure 8 is a diagrammatic view showing the spacing gauges and mechanism for spacing the four bottom slats and the position relative thereto of the end sections of the crate during the nailing operation.

Figure 9 is a detail of one of the gauging stops for the slats.

Figure 10 is another detail of one of the gauging stops.

Figure 11 is a perspective of the crate as made on this machine wherein four slats are nailed on the bottom, it is also adapted to the nailing of only three slats on the bottom.

Figure 1:
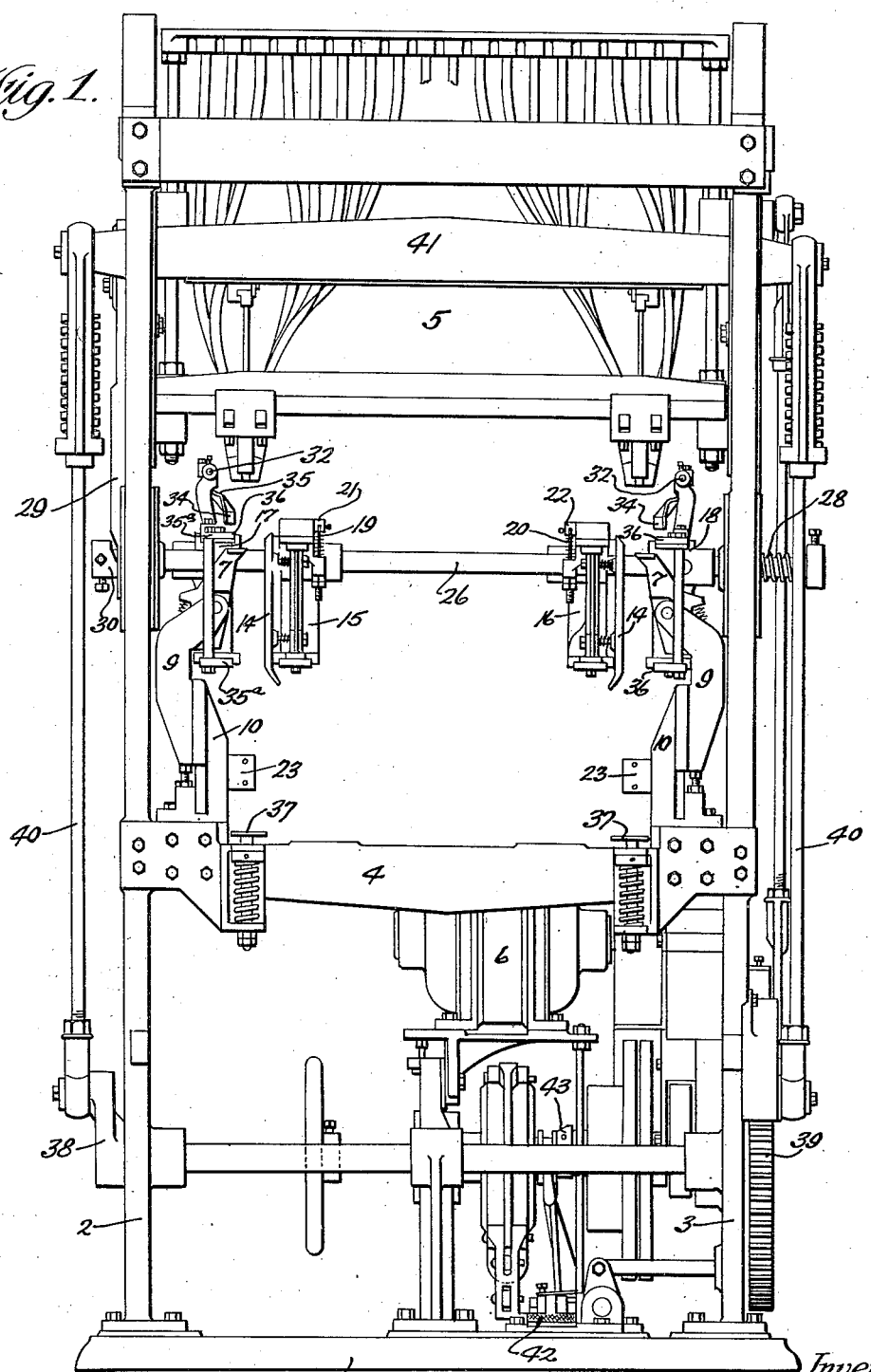

Before proceeding with a more detailed description of the construction and operation of the illustrated machine embodying my invention, I wish to mention that the several views constituting the same were selected and portrayed in a manner that was thought would best illustrate the inventive concept without confining the showing to exact scale or dimensions. The operative features may be more or less diagrammatic, some parts may be more or less out of relative proportion and the engineering features of construction may be somewhat at variance with the best or preferred practices in machines of this type. With this understanding of the accompanying drawings we may proceed with the more detailed description of the construction and operation of the machine illustrated.

The general arrangement and construction of the machine is very similar to other of my patented machines and constitutes a base member 1, side frame members 2 and 3, a bed member 4 for supporting the anvils and attending mechanism and the usual nailing mechanism designated as a whole by the numeral 5. This nailing mechanism is substantially the same as that found in numerous of my other patents and need not be specifically described in this application other than may be necessary to include it in combination with other elements of the invention.

A power motor is designated at 6, which through suitable power connections and devices transmits power to the various operating elements of the machine. This part of the mechanism need not be specifically described other than as may be necessary to include it in combination with the other elements of the invention.

The part of the apparatus illustrated in Fig. 3 gives a front elevation of the box handling and nailing mechanism that forms the principal feature of this invention.

Referring now to this view it will be seen that the cross member 4 constitutes a bed or platform on which the operative mechanism for handling the crate parts is mounted. We should also look at Figs. 3, 4 and 5, while reading the following description.

As has been previously stated, the crate ends for making of lettuce crates are made up of a rectangular frame with several very light slats nailed thereto to form the end section of the crate (see Fig. 11). This structure is not resistant enough to withstand the pressure of driving the nails into the side slats at one operation, hence some means had to be provided to support these rather delicate end sections other than resting them on their opposite sides during this nailing operation. This is accomplished by means of rocking anvils 7 mounted on shafts 8 (see Fig. 5), supported in brackets 9 that are in turn adjustably secured to brackets 10 which in turn are mounted on the cross member or bed 4. These rocking anvils have beveled edges 7a and are held in their normal operative positions by means of the springs 11 bearing against an extension on the said brackets, while another extension on the anvil 7 at 12 abuts against a portion of the supporting bracket 9 and thus positions the anvils in their proper operative relation.

Some crates have four slat bottoms and some have only three slat bottoms. When only three slats are nailed to the bottoms, only the one wide anvil 7 on each side is required to properly support the end sections, but when four slats are nailed to the bottoms an additional short anvil 13 is provided, the top of this anvil being clearly shown in Fig. 4 and Fig. 6.

Opposite the anvil faces are clamping plates 14 yieldably mounted on brackets 15 and 16 as is clearly shown in Fig. 3. These plates are for clamping the end sections in proper spaced relation during the nailing operation, and with the brackets 17 and 18 form spaces into which the crate ends d (see Fig. 11), are easily placed by the operator and which roughly aligns them into nailing position. Carried by the bracket arms 15 and 16 are gauge bars 19 and 20 on which are mounted movable gauge blocks 21 and 22 which blocks are adjusted to properly space the side and bottom slats for either the three or four slat bottoms. Where the three slat bottoms are used they are spaced substantially the same as the side slats which are always three slats.

23 represents stops against which the end sections are pushed when aligning for the nailing of the two sides, and since the crates are wider than deep the crate ends rest above these stops when the bottoms are being nailed on so that they are not in the way for this operation.

After the crate ends are roughly placed by the operator, it is necessary to provide means for accurately spacing them before the side or bottom slats are nailed on. By reference to Fig. 4 this mechanism will be described.

Bolted to the machine side frames 2 and 3 are brackets 24 which in turn carry shafts 25 and 26. Shaft 25 is immovably secured to the brackets 24 while shaft 26 is mounted to slide through brackets 24. Gauge arm brackets 16 and 17 are securely mounted on suitable blocks 27 which are immovably secured to the shaft 25 so that these two gauge arms are fixed members in the gauging system. The gauge arms 15 and 18 are securely fastened to the sliding shaft 26 and form movable gauging arms to work in conjunction with the fixed arms 16 and 17. On the right end of the shaft 26 is a compression spring 28 tending to hold the shaft 26 in the position of Fig. 4. The shaft 26 is given axial movement through the medium of a wedge 29 also seen on Figs. 1 and 3, acting against the collar 30 which is fixed to the shaft 26.

After the operator has placed the crate ends in the machine and before they are clamped therein he places the side slats in position and locates them against the several gauges 21 which have been properly adjusted to place them in correct nailing position. It is not a difficult matter for the operator to place the slats so their sides will bear against the stops 21 and thus quickly align them from top to bottom of the side but it would require a lot of time on his part to align them accurately with the crate ends. To make this aligning step automatic, mechanism has been provided for engaging the ends of the slats during the operation of clamping the crate ends in place and moving each of them into perfect alignment with the crate ends just before the nail chucks contact with them to nail them to the ends. This mechanism is carried by the aligning gauge arms 17 and 18 and comprises brackets 31 bolted to the arms 17 and 18 and each carrying the rock shafts 32 on which are mounted the torsion springs 33, Fig. 5, and the flushing gauges 34 mounted on the brackets 35 which are controlled in their rocking movement by the set screws 36a. When the bracket arm 18 is moved to clamp the crate ends the gauge 34 will engage the ends of the side slats and move them laterally until the opposite ends abut against the gauges 34 on the other side which will accurately place the side slats relative to the crate ends just before the nails are driven.

In order to gauge the crate ends and hold them in vertical alignment as well as parallel during the nailing operation, means are provided for engaging the end frames near the portion resting on the anvils 7 and at a point farther down so that as the ends are clamped they will be held vertical and parallel. This mechanism comprises gauge bars 35ª on the gauge arm 17 and gauge bars 36 on the gauge arm 18 which act in conjunction with the yielding clamp plates 14 to hold the crate ends in perfect alignment in all directions.

Another assistance for the operator to place the crate ends into the places provided therefor comprises the spring held tables 37 nicely shown in Fig. 3. These tables are adjusted by means of the nuts on the spindles so that they will raise the crate ends just above the tops of the anvil faces 7 as the operator pushes the ends into the spaces of the clamping mechanism so that when the ends have reached their positions against the stops 23 the under edge of the top frame member of the ends will slip over the anvil face freely, or they may be adjusted to locate the frames a little high to take care of different thicknesses of frame members which will occur in the making of crates of cheap lumber. When the nailing operation takes place, the slats and end frames are depressed by the nailing chucks until the frame end members rest solidly on the faces of the anvils 7. This downward movement is permitted by the springs under the tables 37 and under the slat gauges 22 and 21 and gauge bars 19 and 20.

I will now describe the operation of the making of a crate by the means of this machine, and will therein include such other details as have not before been specifically mentioned or described.

All of the mechanism except the motor and a part of the drive gear during the idle position are resting as is shown in Fig. 1 of the drawings. The nailing mechanism and the nailing punches are elevated to their highest position through the medium of the crank arm 38 and crank gear 39 and the connecting rods 40 yieldingly attached to the cross member 41 of the nailing mechanism.

The clamping and aligning arms 15 and 18 and their attending mechanism are moved to their full distance away from their companion clamping members 16 and 17 through the medium of the spring 28 on the cross shaft 26, the position of the operating wedge 29 being such that this position may be assumed by the shaft, the wedge being shown in Fig. 1 which shows it elevated with the thin lower end back of the collar 30.

With the mechanism in the positions of Fig. 1, the operator picks up a crate end in each hand from a suitably positioned pile of ends at either side of his position and slides them into the spaces between the clamping and aligning members 15 and 17 and 16 and 18, the lower edges of the crate ends sliding along the spring pressed tables 37. The crate ends as he pushes them into the clamping spaces being positioned with the slats on the insides and the rectangular frames on the outsides. As the first vertical post of the end frames contacts with the anvils 7 they ride along the beveled edges 7a and move the anvils back out of the way until they have reached their positions against the stops 23 when, or just before reaching this position the vertical frame member will have passed beyond the anvil edge and the anvils will spring forward under the lower edge of the top frame member, the height of the tables 37 having been adjusted to position the frame members high enough to permit the anvils to spring thereunder freely.

As soon as the crate ends have been pushed back to their proper positions loosely in the clamping spaces, the operator releases them and reaches for three slats to form the first side of the crate to be made. These slats he lays roughly on top of the gauge bars 19 and 20 in contact with the stop gauges 21 and 22 which places them in proper spacing to the ends from the top to the bottom of the crate but does not space them laterally, with respect to the crate ends, it does, however, place the ends of the slats between the gauging bars 34. When the operator has placed the ends and slats for the first side in the positions just described, the box parts are in rough alignment and ready to be taken by the machine, placed in final perfect alignment and be nailed together. At this point, the operator depresses the foot pedal 42 which throws in the clutch part 43 and turns the machine through one revolution, when it automatically stops in the position of Fig. 1.

The instant the mechanism starts, the nailing mechanism begins to descend and the nailing punches to approach the box parts. The travel of the nailing mechanism is made long enough to permit several necessary aligning operations to take place before the nailing punches touch the slats. The initial movement of the nailing mechanism moves the wedge 29 downward which in turn engages the collar 30 and quickly moves the shaft 26 laterally which carries with it the clamping arms and mechanism 15 and 18. The arms 16 and 17 being fixed as to location they form stops against which the crate ends are moved for final alignment laterally, the stop 17 being the master as it were, in this aligning operation since it is of solid unyielding construction and determines the accurate position of the left crate end. The arm 16 is also fixed as to location but it carries the yielding clamping shoe 14 which presses the right hand crate end firmly against the gauge bars 36 carried by the arm mechanism 18, which is so positioned relative to the arm 17 that the crate ends are properly spaced when these parts reach the limit of their clamping movement.

Simultaneously with the aligning operation just described, the three side slats that were placed on the gauge bars 19 and 20 and which may be the three slats *a*, *b* and *c*, of Fig. 11, are engaged by their ends by the flushing gauge 34 carried by the arm 18 and all moved laterally, if they need such movement, to place them in alignment with the crate ends, and their opposite ends placed against the opposite flushing gauge 34 at the left of the machine. The left hand gauge 34 is fixed as to location and is adjusted to align with the gauge bars 35*a* so that these ends of the three side slats will be properly aligned with the left hand crate end, the right hand flushing gauge 34 is aligned with the gauge bars 36 carried by the arm 18. The rockers 35 carrying the flushing gauges 34 are adjusted by means of the set screws 36*a* and held in operative positions by means of the torsion springs 33. The above aligning operations take place while the wedge 29 is moving past the incline on the collar 30 and is all accomplished just before the nailing punches contact with the side slats.

The tables 37 and the springs 19*a* and 20*a* normally hold the crate ends and the side slats in a slightly elevated position, so that as the nailing punches contact with the ends of the side slats, the crate ends and the slats are depressed slightly until the top end frames rest firmly on the faces of the anvils 7, the instant this happens the nails begin to enter the wood, the nail punches rest firmly on the slat ends and the nailing operation is accomplished as the cranks 38 and 39 carry the connecting rods 40 to their lowest operative position. The nailing operation is now completed and the parts all assume the positions of Fig. 1 as the nailing mechanism travels to its upper and idle position.

The crate ends now have the first side slats nailed thereto and the nailed sections have been released so the operator may manipulate the parts to position them for the next nailing operation.

The operator now grasps the ends, draws them toward him slightly and tips the nailed side down bringing the bottom edges of the crate ends uppermost and positions the ends in the clamping spaces with the nailed side at the front of the machine and with the end frame members hanging on the anvils 7 and pushes them back against the shaft 26 which acts as the back aligning gauge for this nailing position. The crate ends with the nailed on side slats may be easily pulled out of the clamping spaces sufficiently for this positioning operation because of the beveled edges 7*a* on the anvils 7 and 13.

The bottom of the crate being somewhat wider than the crate is deep an auxiliary anvil 13 is provided to help support the long side of the crate ends during the operation of nailing on the bottom slats.

The crate is located central with the center line of the machine when the bottom slats are being nailed on, hence either three or four slats may be nailed on as bottom slats and either may be properly aligned relative to the sides of the crate ends by adjusting the stop gauges 21 and 22 along the bars 19 and 20 to properly space either three or four slats. When four slats are used, however, an additional gauge is provided in the gauge blocks 44, Figs. 4 and 8, wherein two of the gauge blocks 21 are adjusted to align the first three slats of the four slat set and the gauge block 44 aligns the last slat of the set as is shown in Fig. 8, while if only three slats are to be employed on the bottom then the gauges 21 and 22 will be adjusted to align the three slats centrally with the crate bottom. Of course, in changing from either the three set to the four set the nailing punches must also be adjusted to contact with the repositioned slats so the nails will be driven in the proper locations. In nailing on three slats, one set of nailing punches becomes automatically inoperative so that no nails are dropped at this station. This automatic device has been described and claimed in other of my patents so need not be specifically described herein, since it operates in the same manner.

When the crate ends have been hung on the anvil faces and the bottom slats have been placed by the operator, he again depresses the clutch pedal 42 when the machine moves through one cycle and a nailing and aligning operation takes place relative to the bottom slats in substantially the same manner as has been described for the nailing of the slats on the first side. When the bottom slats have been nailed to the crate ends and the partially made crate parts are released by the mechanism, the operator again grasps the partly completed crate, pulls it toward the front of the machine, at the same time tilting it downward and resting the slats *a*, *b* and *c* that were first nailed on, on the tables 37 and pushes the crate back until the end frames abut against the stops 23, when the crate will be aligned for nailing on the last side slats. In this position the slats first nailed on are on the under side resting on the tables 37 and the bottom of the crate is positioned at the front of the machine as is indicated at 45, Fig. 5.

The adjustment of the gauge blocks 21 and 22 on the bars 19 and 20 may be such that the spacing of the three side slats for either side and the first three bottom slats of the bottom set are substantially the same, as will be seen by a study of Figs. 6 and 7. In Fig.

6 there is shown a crate with four slats on the bottom and three on each side and the center line of the machine shows that the crate is central with the machine when the four bottom slats are nailed on and that the lower three slats in this view are spaced the same as the three end slats, or rather the three side slats, the fourth bottom slat or the top one in this view having been gauged against the gauge blocks 44 during the nailing operation.

Fig. 7 shows a crate having a three slat bottom spaced substantially the same as the three side slats and in the nailing operation the crate is central with the center line of the machine in each nailing position and the side and bottom slats are equally spaced relative to each other.

With crates having a four slat bottom, the end frames are gauged against the stop 23 during the operation of nailing the side pieces to the end frames; the side frames are gauged against the shaft 26 during the operation of nailing the four bottom slats to the side frames. (See Fig. 6.)

With the three slat bottom the gauge 23 must be replaced with another gauge to space the frames centrally while the side slats are being nailed, as is shown in Fig. 7, at 23a. The relative position of 23a is also shown in Fig. 6, the frames being gauged against the shaft 26 when the bottom slats are being nailed on the same as for the four slat crate; the adjustable gauge blocks 21 and 22 being adjusted to space the side and bottom slats the same.

I have mentioned that the slats the operator lays on the gauge bars 19 and 20 are slightly elevated above the nailing line. This is done to make a clear unobstructed entryway for the quick and easy placing of the slats in approximate alignment with the crate ends. The gauge bars 19 and 20 are held in this elevated position by means of the springs 19a and 20a—Fig. 9 shows them in this elevated position while Fig. 10 shows them in the depressed position while the nails are being driven. The nailing chucks acting to depress the slats when they first contact therewith until they rest firmly onto the positioned end frames when the nails will be driven, securing them to the ends. The combined tension of the springs 19a and 20a and those under the tables 37 will tend to lift the crate parts after a nailing operation, so that they will be free for the next manipulation by the operator.

The continuous operation of making lettuce crates on this machine is a continuation of the sequence of operations explained and the speed at which the machine may be operated is controlled entirely by the skill and speed of the operator handling the crate parts.

I have confined the description mainly to the making of lettuce crates, it is obvious, however, that crates for any purpose, or boxes, may be made on this machine by simply adjusting the gauging elements to suit the type of crate or box being made.

What I claim as new and desire to cover by Letters Patent is:—

1. An apparatus for making slatted crates comprising means for receiving loosely previously made crate ends consisting of rectangular frame members and spaced thin slats, means for receiving loosely a plurality of side and bottom slats in the sequence of side, bottom and side, automatic means for engaging said crate ends and said positioned slats and giving them final alignment relative to each other, power means for operating said apparatus in cycles, nailing means for securing positioned slats to said crate ends during each cycle of operation, with means adapted for automatic reciprocation for supporting said crate ends comprising a member resting directly under the top bar of said rectangular frame members directly under the nailing line to prevent collapse of said crate ends during the nailing operation and means for automatically reciprocating said last mentioned supporting means.

2. An apparatus for making boxes comprising means for loosely receiving previously made box ends, means for loosely receiving a plurality of side and bottom slats in proper sequence, automatic means for then engaging said loosely positioned box parts and bringing them into final relative alignment for the making of a rectangular box, power means for operating said apparatus in cycles, nailing means for securing said box parts together during each cycle, with means adapted for reciprocation for supporting said box ends near the nailing line to prevent collapse of the said ends during the nailing operation.

3. An apparatus for making boxes comprising means for loosely receiving previously made box ends consisting of rectangular frame members and thin slatted panels, means for loosely receiving a plurality of thin side and bottom slats in proper sequence, automatic means for then placing said loosely positioned box parts into final relative alignment for the making of a box, power means for operating said apparatus in cycles, nailing means for securing said box parts together during each cycle, and means adapted for alternately entering and withdrawing from under the top bar of said end frame members during each nailing operation to take the strain of the nailing operation and prevent collapse of the said thin slatted panels.

4. An apparatus for making boxes comprising means for loosely receiving previously made box ends consisting of rectangular frame members and thin slatted panels, means for loosely receiving a plurality of side and bottom panels in sequence, automatic means for then engaging, aligning and clamping said loosely positioned box parts into proper relative positions to form a properly dimensioned box, nailing means then acting to permanently secure said clamped parts together, with means adapted for intermittent resting under the top bar of said end frame members during the nailing operation to take the nailing thrust and prevent collapse or distortion of the thin slatted end panels.

5. An apparatus for making boxes in a synchronized sequence of operations comprising means for loosely receiving framed box ends and loosely holding them in approximate spaced alignment, other means for receiving a plurality of side and bottom parts and loosely holding them in approximate alignment relative to said positioned ends, automatic means for then engaging said positioned parts and moving them laterally into, where necessary, proper relative alignment to form a properly dimensioned box, means adapted for intermittent resting under the top bar of said positioned framed ends during the nailing operation to absorb a substantial part of the nail driving thrust and prevent the same from traveling through the said framed ends and thereby causing collapse or distortion, and power means to operate said apparatus.

6. An apparatus for making boxes out of previously made framed end members and thin slats to form side and bottom members comprising means for loosely receiving said framed ends including a movable member that is displaced during the placing of the ends and automatically assumes a position under a portion of the framing of said ends after they are thus loosely positioned, to absorb a substantial part of the nail driving thrust during the nailing operation and thereby prevent collapse or distortion of said end members, automatic means for engaging said loosely positioned box parts and moving them into proper relative positions to form a properly dimensioned box, other means for loosely receiving side and bottom members with automatic means for engaging said members and moving them into proper relative relation with said positioned end members, nailing means for then securing said parts together, and power means for operating said apparatus.

7. An apparatus for making boxes comprising means for loosely receiving a plurality of box parts in sequence to form a box having one open side, automatic means for then engaging said loosely positioned parts and moving them laterally into proper nailing relation, fixed gauging means against which said parts are moved with clamping means for then holding said parts so positioned, nailing means for then securing said positioned parts together, power means adapted for reciprocation for operating said apparatus, and means for absorbing a substantial part of the nailing thrust and thereby eliminating strains to the said box parts.

8. An apparatus for making boxes comprising means for loosely receiving a plurality of box parts in sequence to form an open sided box, automatic means for then engaging said loosely placed parts and positioning them relative to each other into proper nailing alignment, fixed and movable gauging members acting on said parts to position the same, clamping means for holding the positioned parts into the placed alignment during the nailing operation, nailing means for securing said parts together, power means for operating said apparatus, and means adapted for reciprocation for absorbing a substantial portion of the nailing thrust and thereby eliminating strains to the sides or ends of the box.

9. An apparatus for securing box parts together comprising means for loosely receiving a plurality of box parts simultaneously, automatic means for engaging the said loosely positioned parts and moving them into proper relative positions preparatory to nailing them together, reciprocally movable nailing anvils for absorbing a substantial portion of the nailing thrusts and preventing said thrusts from passing into the sides or ends of said box parts, means whereby said nailing anvils may be reciprocally moved, fixed and movable gauging members for properly aligning said box parts and clamping means for holding them after alignment, nailing means for securing the parts together, and power means for operating the said devices.

10. An apparatus for making boxes comprising means for loosely receiving box parts, automatic means for accurately positioning said parts, clamping means for holding the positioned parts, nailing means for simultaneously securing the parts together at opposite ends of the box, means adapted for reciprocation for absorbing a substantial part of the nailing thrusts and preventing the thrusts from passing through the ends or sides of the said boxes during the nailing operations, and power means for operating said several devices.

11. An apparatus for making boxes comprising box part aligning means and nailing means, a rocking nailing anvil for supporting the box parts during the nailing operation in a manner to absorb a substantial part of the nailing thrusts and prevent the thrust from passing into or through the box sides or ends, and means for automatically rocking said nailing anvil to and from the position in which it supports the box parts during the nailing operation.

12. An apparatus for making boxes comprising box part aligning means and nailing means, a fixed gauge member and a movable gauge member for each end of a box, a nailing anvil adjacent said gauge members movable out of its normal operative position by the insertion of a box part into said gauging members and automatically returning into operative position when the said parts are loosely positioned, said gauge members acting to give final alignment to said box parts without further movement of said anvils and clamping means for holding the said parts in nailing position, means for receiving and aligning box parts to be secured to said box ends, and power means for operating said mechanism when said parts are properly positioned.

13. An apparatus for making boxes comprising box part aligning means and nailing means, for securing aligned parts together, anvil means for supporting said box parts during the nailing operation which will absorb a substantial portion of the nailing thrusts and prevent the same from passing into or through the said box parts, gauging means for positioning said parts into proper nailing position, clamping means for holding the parts so positioned, and yielding bottom supports for said box ends and yielding means holding said anvils in operative positions.

14. An apparatus for making boxes comprising box part aligning means and nailing means, a nailing anvil movable out of its normal operating position by the insertion of box parts and automatically returnable to operative position after the said parts are positioned, gauging means for aligning box parts into proper nailing positions, and yielding means permitting said positioned box parts to be depressed just prior to the nailing operation, the said nailing anvil holding said parts from further depression when said parts contact therewith and taking a substantial part of the nailing thrusts away from said box parts.

15. An apparatus for making boxes in a properly synchronized sequence of operations comprising box part aligning means and nailing means, reciprocally movable nailing anvils for supporting box ends near the nailing line whereby to absorb a substantial portion of nailing thrusts and prevent the thrusts from entering the panels of the said box ends or sides, means whereby the nailing anvils may be reciprocated, a fixed gauging device and a movable gauging device each provided with gauging members to act on both end and side parts of a box simultaneously to align them for nailing together, yielding means for clamping the aligned parts during the nailing operation, and power means for operating the said devices.

16. An apparatus for making boxes comprising box part aligning means and means for nailing aligned parts together, means for loosely receiving box parts, including a nailing anvil adapted for automatically intermittently entering under a box part for supporting parts near the nailing line to protect delicate box parts from receiving any substantial part of the nailing thrusts, side and bottom gauging means having a range of adjustment permitting a change in positioning of said boxes, relative to the nailing means gauging means for properly aligning positioned box parts, clamping means for holding said parts during the nailing operation, and means for automatically intermittently positioning the nailing anvil under a box part which receives nailing thrust.

17. An apparatus for making boxes comprising box part aligning means and means for nailing aligned parts together, means for loosely receiving box parts and thereafter engaging said parts and moving them into nailing positions, a nailing anvil adapted for reciprocable movement for intermittently supporting box parts in a manner to absorb a substantial part of the nailing thrusts and prevent them from passing into delicate box ends or sides, gauging means having a range of adjustment permitting a change in positioning of said boxes relative to the nailing means and power means for operating said apparatus.

In testimony whereof I have signed my name to this specification.

GEORGE D. PARKER.